United States Patent
Wang et al.

(10) Patent No.: US 11,875,477 B2
(45) Date of Patent: Jan. 16, 2024

(54) METHOD FOR CORRECTING ABNORMAL POINT CLOUD

(71) Applicant: NATIONAL APPLIED RESEARCH LABORATORIES, Taipei (TW)

(72) Inventors: Chih-Wei Wang, Hsinchu (TW); Chuan-Lin Lai, Hsinchu (TW); Chia-Chen Kuo, Hsinchu (TW); I-Chen Wu, Zhubei (TW)

(73) Assignee: National Applied Research Laboratories, Taipei (TW)

( * ) Notice: Subject to any disclaimer, the term of this patent is extended or adjusted under 35 U.S.C. 154(b) by 276 days.

(21) Appl. No.: 17/354,188

(22) Filed: Jun. 22, 2021

(65) Prior Publication Data
US 2022/0172327 A1 Jun. 2, 2022

(30) Foreign Application Priority Data
Dec. 1, 2020 (TW) ................. 109142202

(51) Int. Cl.
*G06T 5/00* (2006.01)
*G06T 7/00* (2017.01)
*G06F 18/2135* (2023.01)

(52) U.S. Cl.
CPC .......... *G06T 5/001* (2013.01); *G06F 18/2135* (2023.01); *G06T 7/0002* (2013.01); *G06T 2207/10024* (2013.01); *G06T 2207/10028* (2013.01); *G06T 2207/20021* (2013.01); *G06T 2207/30168* (2013.01)

(58) Field of Classification Search
CPC .............. G06T 5/001; G06T 7/0002; G06T 2207/10024; G06T 2207/10028; G06T 2207/20021; G06T 2207/30168; G06F 18/2135
USPC ........................................... 382/167
See application file for complete search history.

(56) References Cited

U.S. PATENT DOCUMENTS

| | | | |
|---|---|---|---|
| 2019/0179021 A1* | 6/2019 | Wang | G06N 3/045 |
| 2019/0258225 A1* | 8/2019 | Link | G05B 19/4097 |
| 2020/0104626 A1* | 4/2020 | Shtok | G06T 7/50 |
| 2020/0111225 A1* | 4/2020 | Chondro | G05D 1/0088 |
| 2021/0090263 A1* | 3/2021 | Liu | G01S 7/4808 |
| 2021/0142497 A1* | 5/2021 | Pugh | G06T 7/55 |
| 2021/0201476 A1* | 7/2021 | Prasad | G06T 7/0012 |

OTHER PUBLICATIONS

"Digi Embededded Yocto Version 2.2: Image Processing Unit (IPU)"; www.digi.com, Published Jan. 22, 2018.

\* cited by examiner

*Primary Examiner* — Ali Bayat
(74) *Attorney, Agent, or Firm* — Rosenberg, Klein & Lee

(57) ABSTRACT

A method for correcting abnormal point cloud is disclosed. Firstly, receiving a Primitive Point Cloud Data set by an operation unit for dividing a point cloud array into a plurality of sub-point cloud sets and obtaining a plurality of corresponding distribution feature data according to an original vector data of the Primitive Point Cloud Data set. Furthermore, recognizing the sub-point cloud sets according to the corresponding distribution feature data for correcting recognized abnormal point cloud. Thus, when the point cloud array is rendered to a corresponding image, the color defect of the point cloud array will be improved or decreased for obtaining lossless of the corresponding image.

11 Claims, 21 Drawing Sheets

Figure 1:
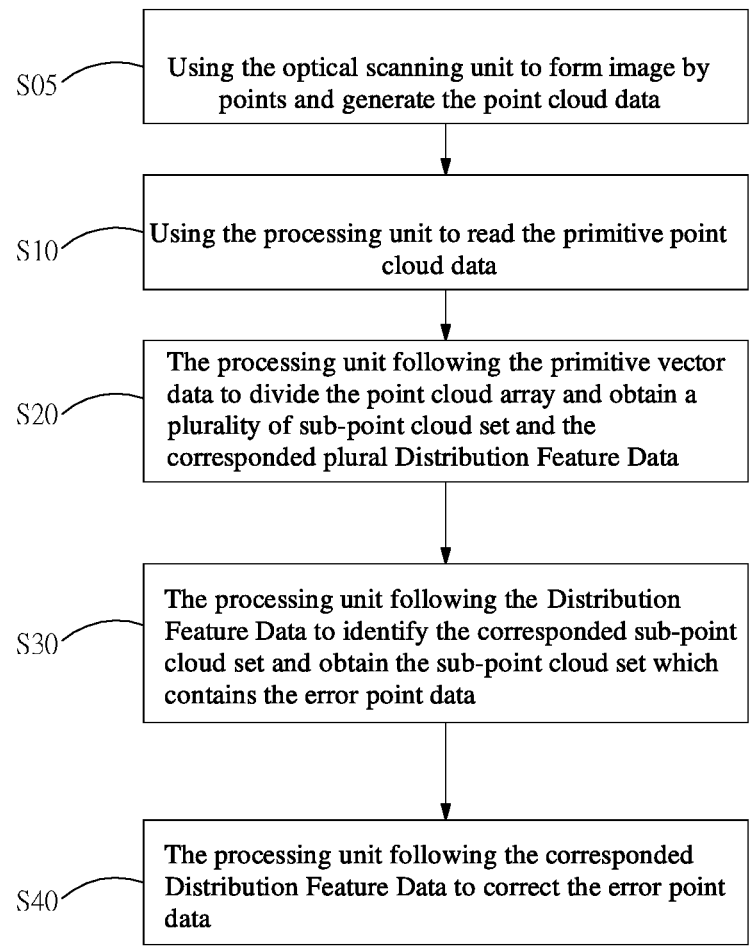

S310 — The Processing Unit following the categorization of Sub-point Cloud Set and the corresponded point cloud marking numbers to identify the Normal Point Data and the Error Point Data

FIG. 4A

S312 — The Processing Unit following the second category point cloud and the corresponded labelling numbers to identify and obtain the Error Point Data

FIG. 5A

METHOD FOR CORRECTING ABNORMAL POINT CLOUD

FIELD OF THE INVENTION

This application refers to an image correcting method, particularly the method for correcting the abnormal point cloud data.

BACKGROUND OF THE INVENTION

Nowadays, point clouds can be generated through the methods of image pair parallax or electromagnetic wave emission/receiving calculation. It is known that the accuracy of point cloud calculated from the image parallax is limited by the imaging device, image quality, intersection angle of the captured image, photo density, angle of the observed object and the surface flatness of object, etc.

Generally, in the processing of point cloud, the processing speed of the computer in processing the point cloud grid is inversely proportional to the number of point cloud grids. For the case of large number of grids and complicate object shapes, it will increase the difficulty of point cloud correction. Nowadays, most point cloud correction methods are corrected by manual operation. However, point cloud data usually has hundreds, thousands or more points. If we rely merely on human eyes to find specific abnormal points from massive point cloud data points, it will easily cause eye fatigue and increase the loading of users, greatly reducing the efficiency of point cloud data calibration.

According to the aforesaid problem, this application provides a method for correcting abnormal point cloud data by dividing the point cloud array into a plurality of sub-point cloud sets and using the corresponding distribution feature data for identification, which will identify and correct the error point data. In this way, the point cloud processing efficiency and the image quality corresponding to the point cloud array can be both improved effectively.

SUMMARY

An objective of this application is to provide a method for correcting abnormal point cloud data, which uses a processing unit to divide the point cloud array into a plurality of sub-point cloud sets for identifying error point data and the distribution feature data corresponding to the sub-point cloud sets, which is to identify the error point data and perform corrections based on the distribution feature data, improving the point cloud processing efficiency and avoid image quality distortion.

Regarding the above objective, this application provides a method for correcting abnormal point cloud data, which firstly uses a processing unit to read a primitive point cloud data, the primitive point cloud data includes a plurality of normal point data, at least one error point data and a primitive voxel space data; next, the processing unit divides the primitive point cloud data according to the primitive voxel space data and obtains a plurality of sub-point cloud sets and corresponding plural distribution feature data; these sub-point cloud sets have the normal point data and the error point data; the processing unit identifies the corresponding sub-point cloud sets according to the distribution feature data and obtains the error point data; and the processing unit follows one of the corresponding distribution feature data of the error point data to perform regression operation and correct the error point data to a normal point data. Through these sub-point cloud sets and their corresponding distribution feature data, recognize and identify the error point data and perform correction based on the distribution feature data, which thus has improved the point cloud processing efficiency and avoids the image quality distortion.

This application provides an embodiment, wherein the normal point data and the error point data respectively include a coordinate data, a color data, and an intensity data each, and the coordinate data corresponds to the primitive voxel space data.

This application provides an embodiment, wherein the distribution feature data includes a plurality of normal point data, and a plurality of position eigenvalues, color eigenvalues and intensity eigenvalues corresponding to the error point data.

This application provides an embodiment, wherein before the step of using a processing unit to receive a primitive point cloud data, it further includes a step of using an optical scanning unit to perform point-by-point imaging and generate the point cloud data.

This application provides an embodiment, wherein the optical scanning unit is a lidar, a 3-D laser scanner or a beam scanner.

This application provides an embodiment, wherein in the step of dividing the point cloud data by the processing unit according to the original vector data, the processing unit performs a nearest neighbor index operation, a principal component analysis operation and a de-constraint conversion operation according to the primitive point cloud data and obtains the distribution feature data, which respectively correspond to all neighboring points of each image point in the sub-point cloud sets; the processing unit categorize the sub-point cloud sets according to the distribution feature data to obtain a plurality of category labels; and the processing unit labels the sub-point cloud sets according to the category labels.

This application provides an embodiment, wherein the processing unit performs the nearest neighbor index operation by running a K-Nearest Neighbor (KNN) search algorithm to run the primitive point cloud data, obtaining the nearest neighbor data of the normal point data and the error point data; the processing unit performs the principal component analysis operation and the conversion operation according to the three-axis variances and the primitive point cloud data. The processing unit performs the de-constraint conversion operation by means of logarithmic operation according to the three-axis variances, in the prospective of removing the boundaries corresponding to these variances.

This application provides an embodiment, wherein in the step of identifying the sub-point cloud sets by the processing unit according to the distribution feature data, the processing unit follows the category of the sub-point cloud sets and corresponding to a plurality of labels to identify the normal point data and the error point data.

This application provides an embodiment, wherein in the step of identifying the sub-point cloud sets by the processing unit according to the distribution feature data, the processing unit follows at least one second categorizing point cloud and at least one corresponding label to identify and obtain the error point data.

This application provides an embodiment, wherein in the step of correcting the error point data by the processing unit according to a distribution feature data, the processing unit follows the error point data and the color data of its neighboring point data to perform the regression operation and obtains a first color correction data corresponding to the error point data; then, the processing unit follows the first color and the color of neighboring point data making regression operation to obtain a second color correction data corresponding to the error point data; and the processing unit follows a corresponding weighted average method for the sub-point cloud sets and combines it with the first color correction data and the second color correction data to obtain a standard color correction data and overwrite the error point data.

This application provides an embodiment, wherein in the step of correcting the error point data by the processing unit according to a corresponding distribution feature data, the processing unit performs a regression operation according to a position data corresponding to the error point data to obtain a position regression data; the processing unit reads an image color data according to an image capture data corresponding to the error point data and performs a regression operation to obtain a color regression data; and the processing unit follows a weighted average method corresponding to the sub-point cloud sets and combines it with the position regression data and the color regression data to create a color regression unit, used to correct the error point data.

SCHEMATIC DESCRIPTION

FIG. 1: The flowchart in an embodiment of this application; and

Figure 2A:
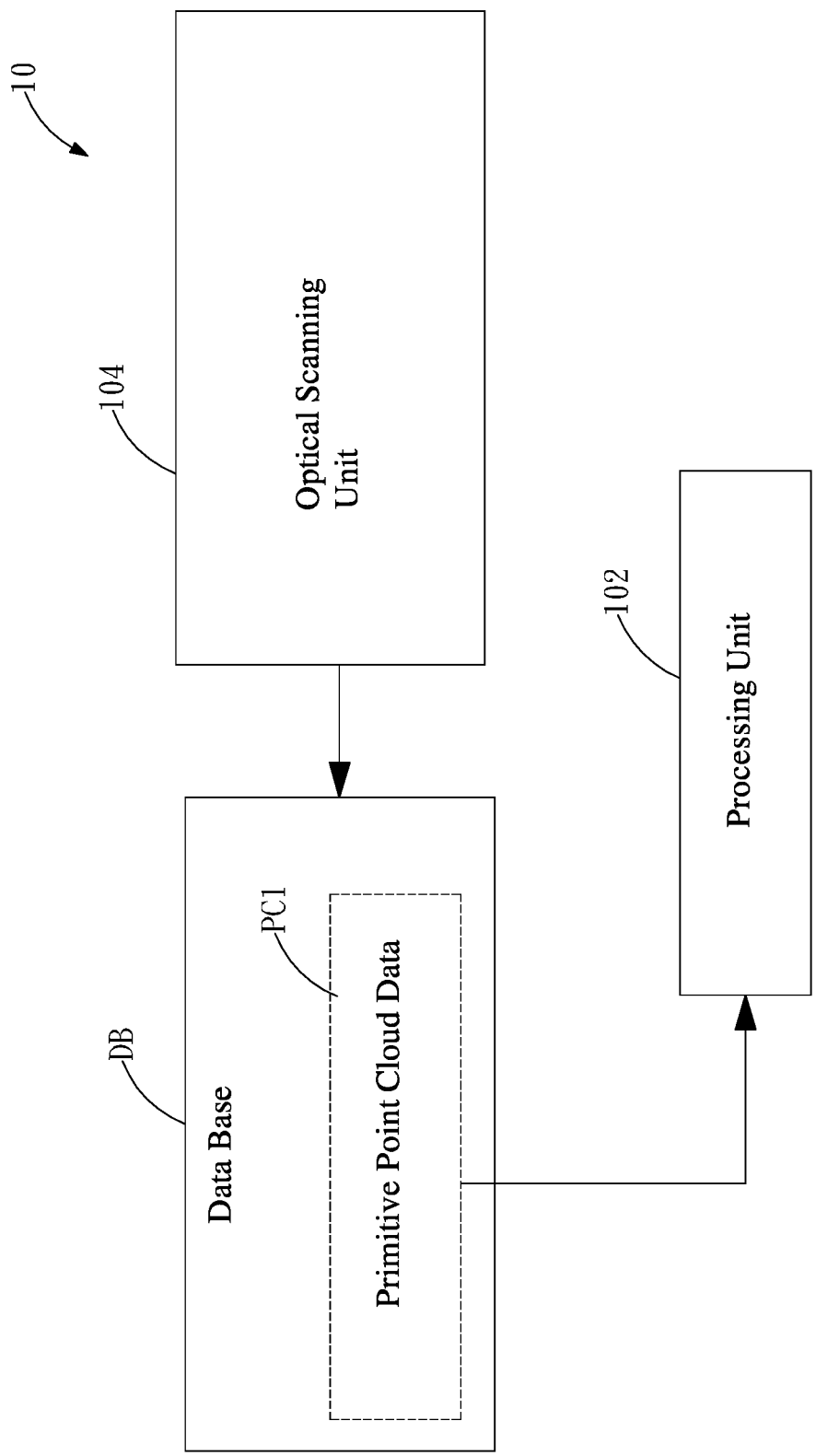
Figure 2B:
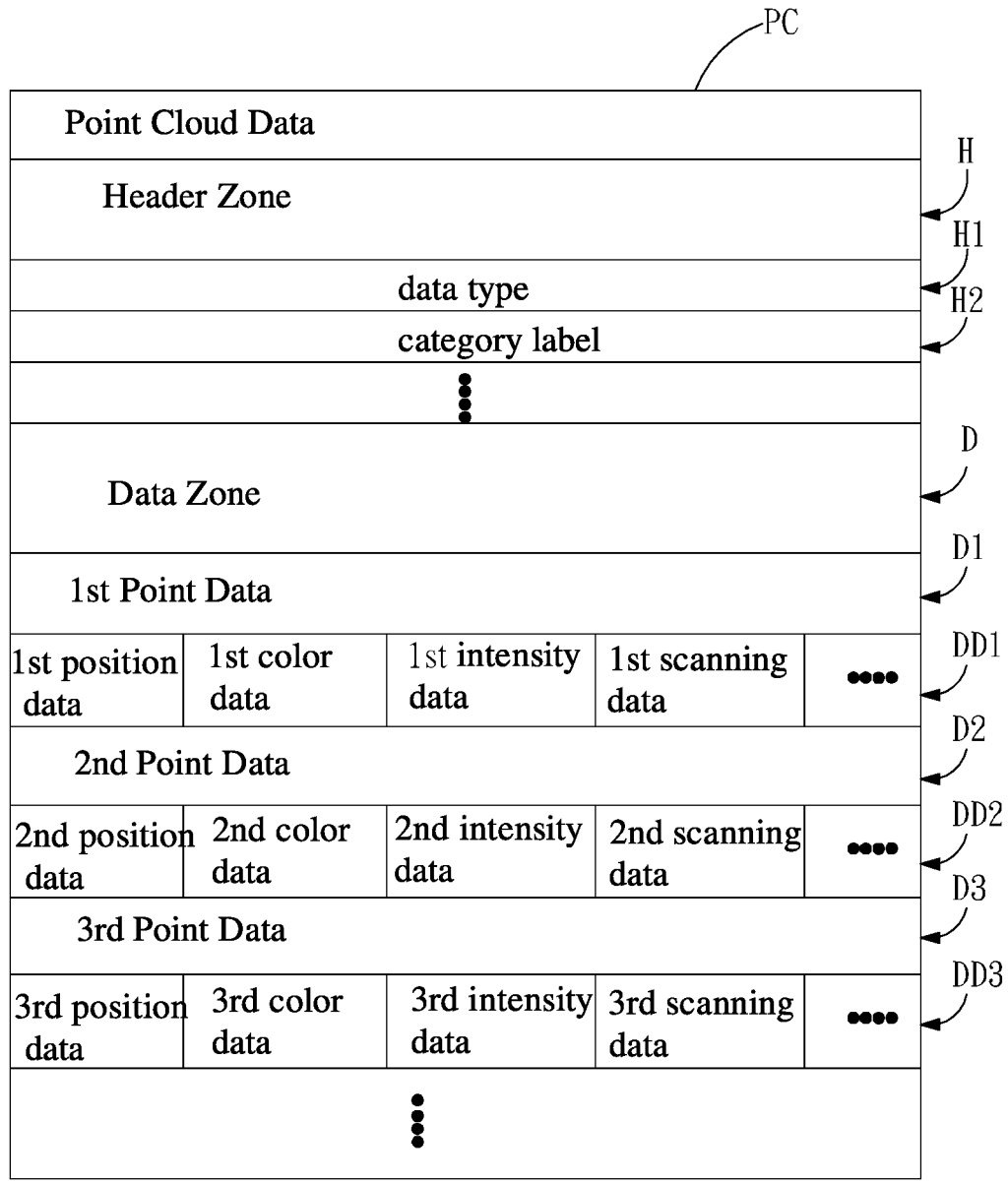
Figure 2C:
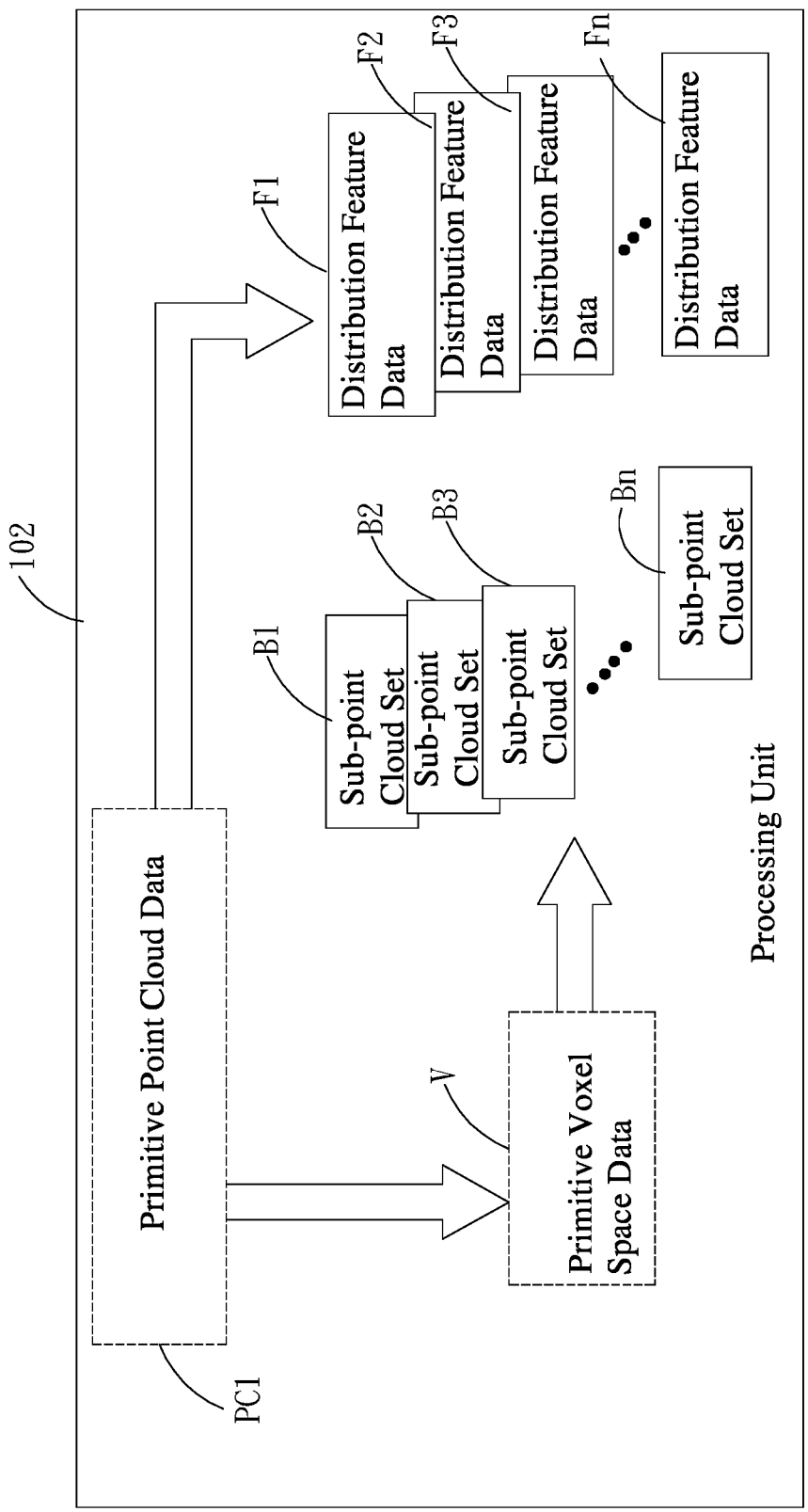
Figure 2D:
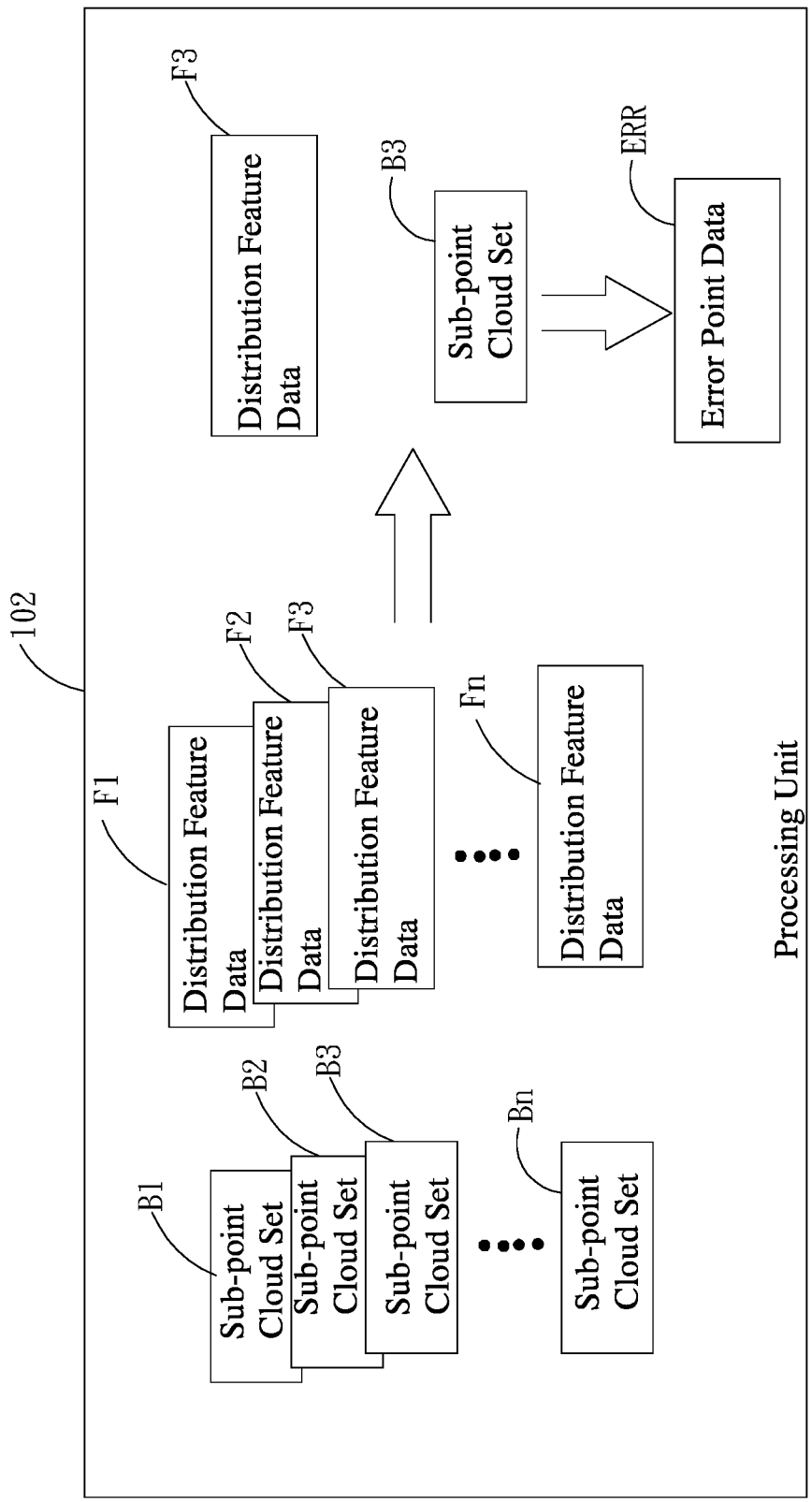
Figure 2E:
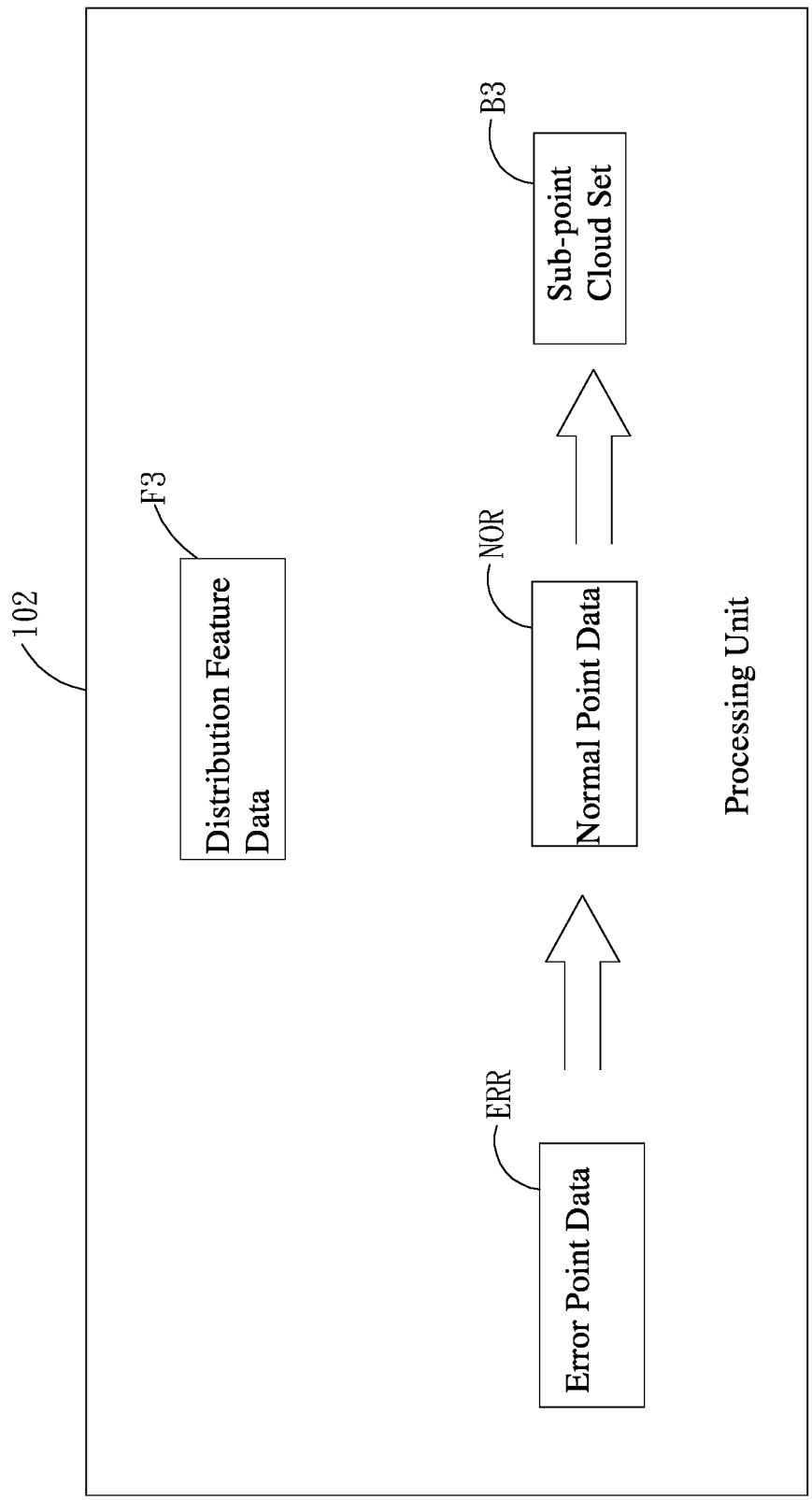
Figure 3A:
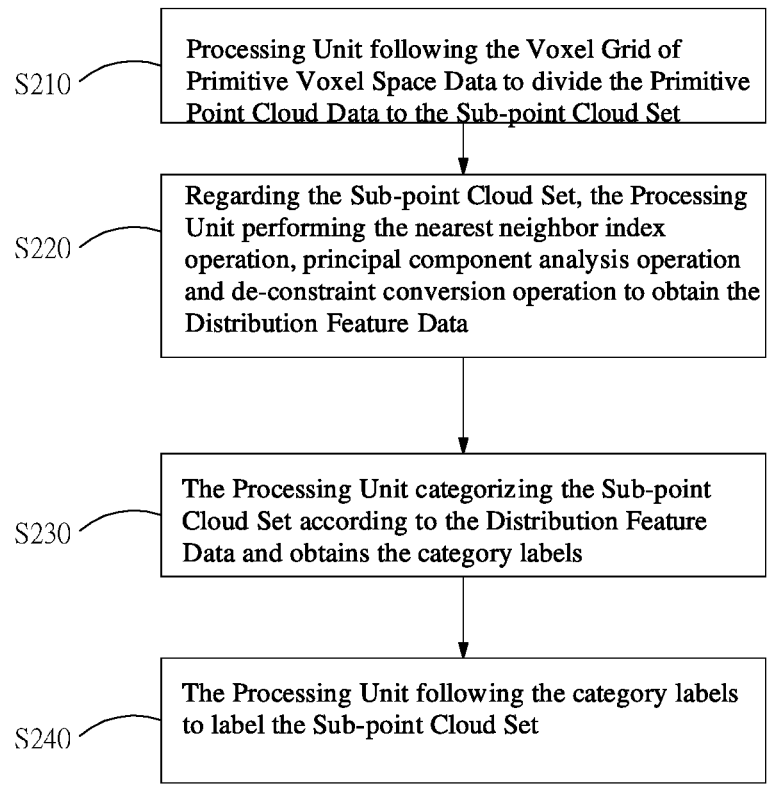
Figure 3B:
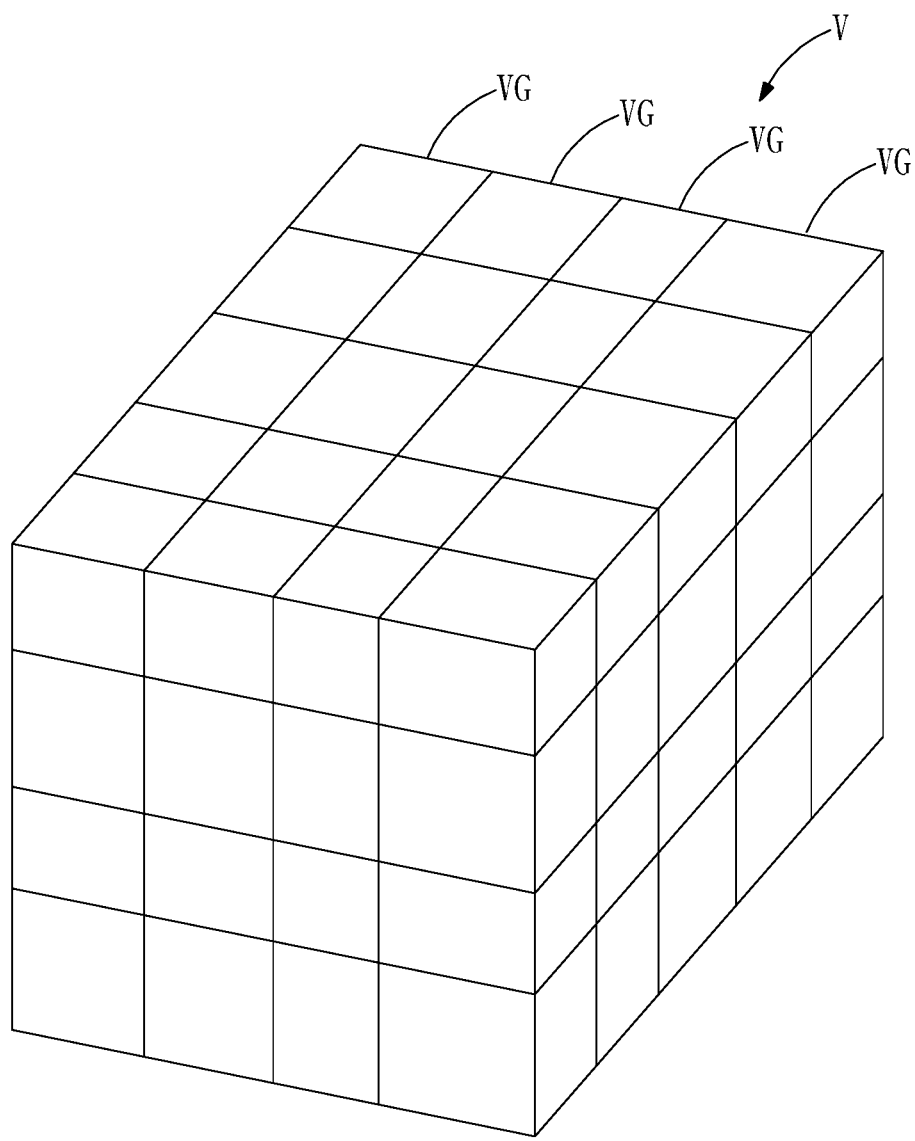
Figure 3C:
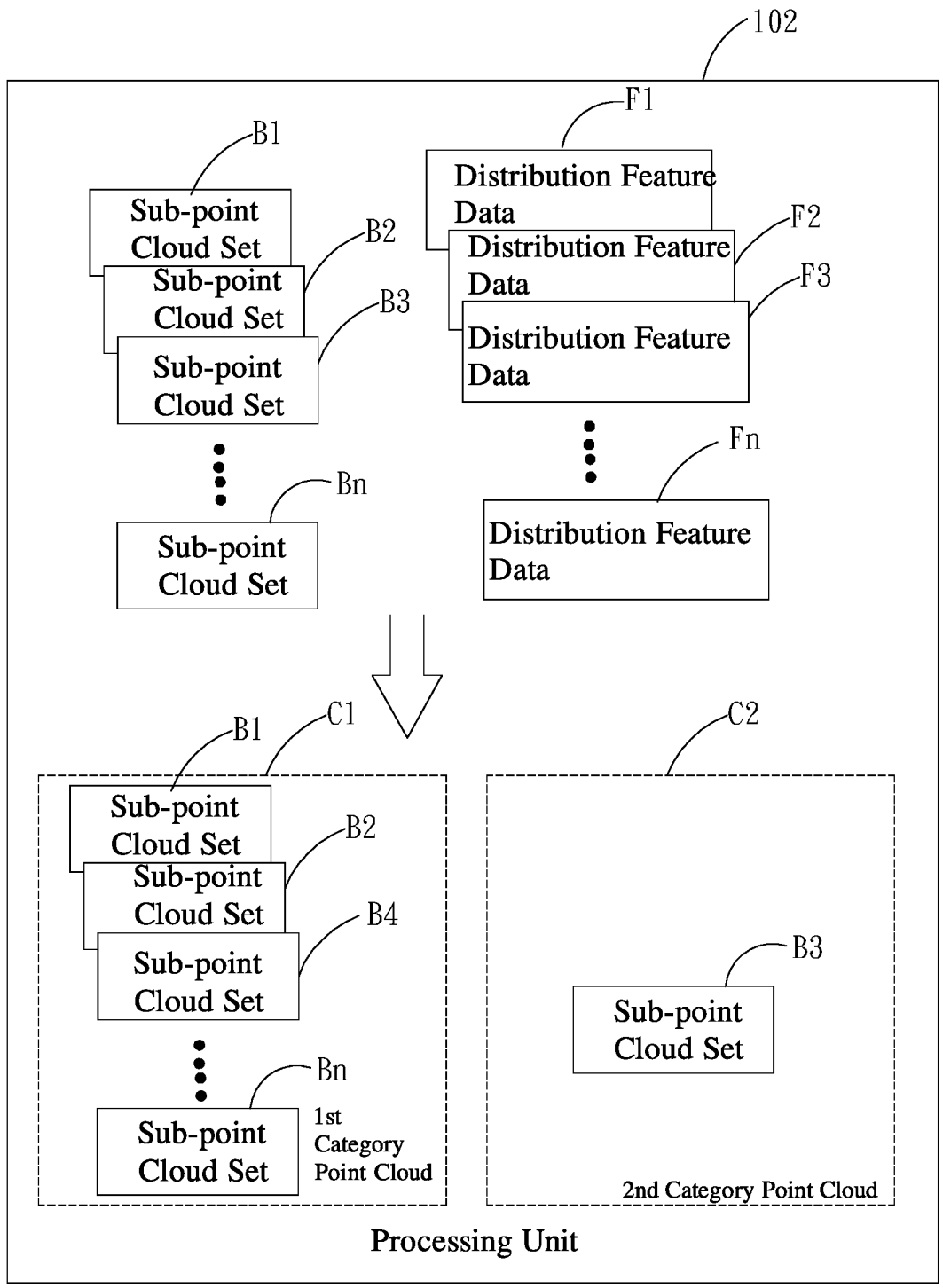
Figure 4B:
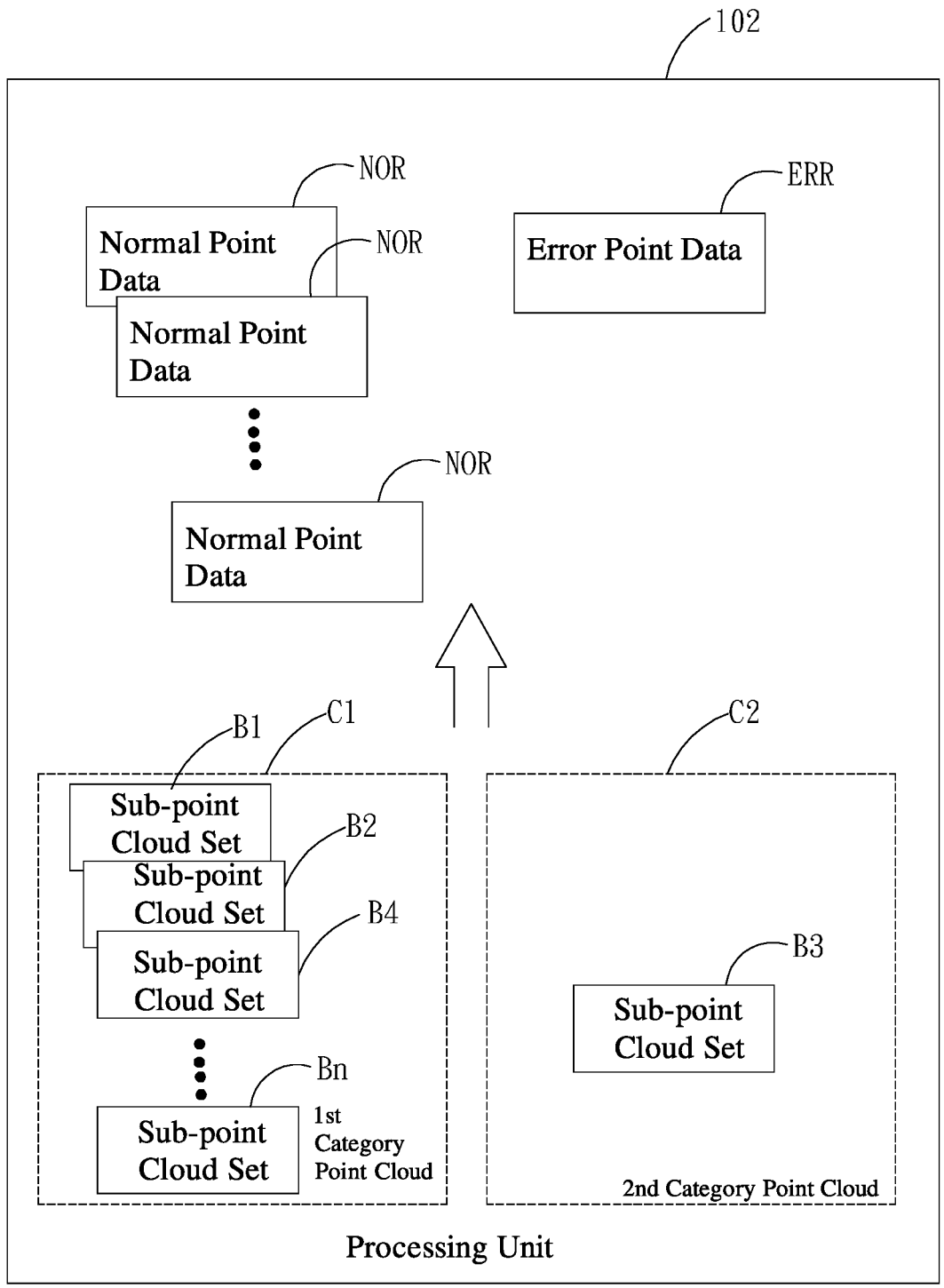
Figure 5B:
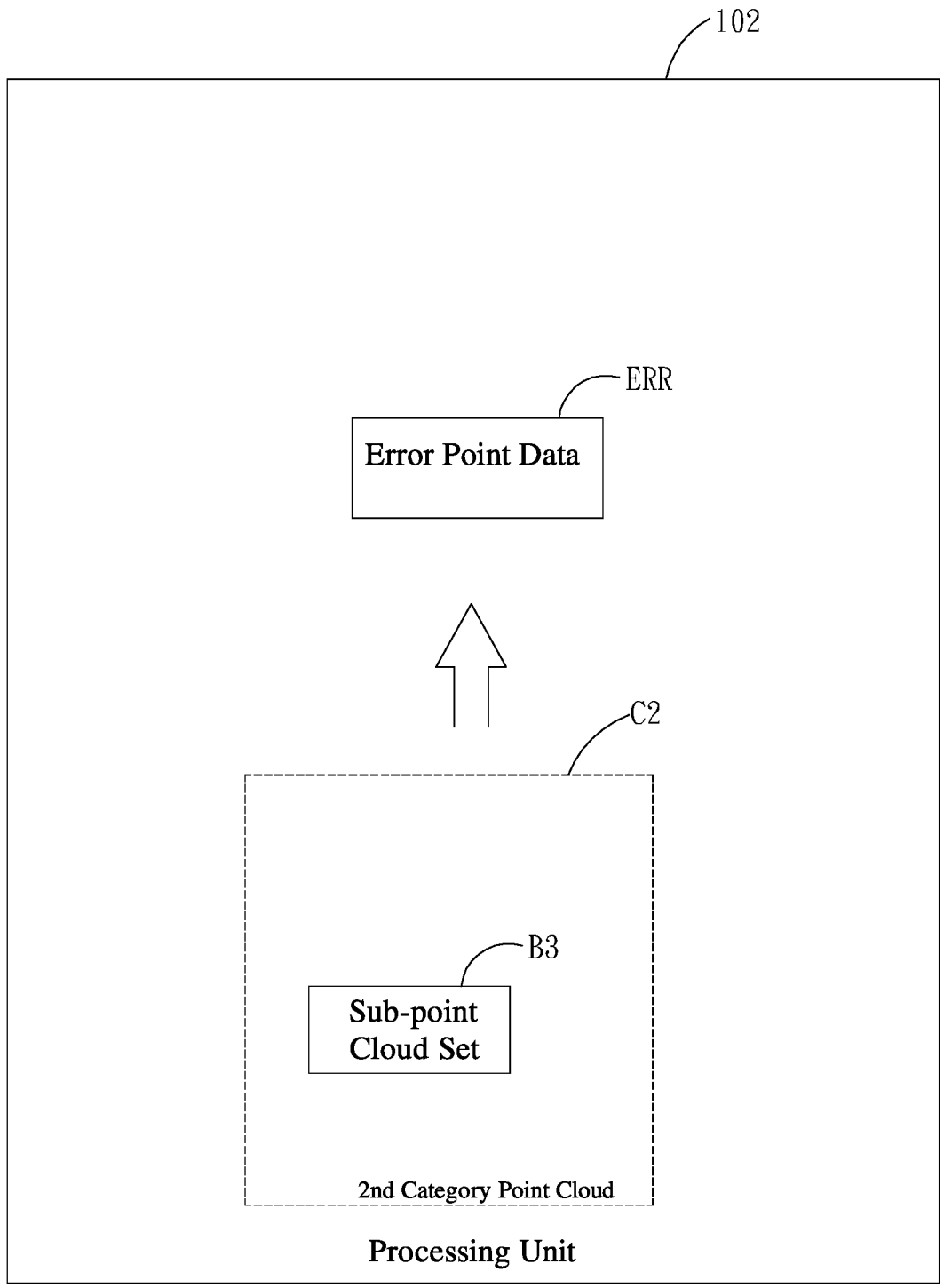
Figure 6A:
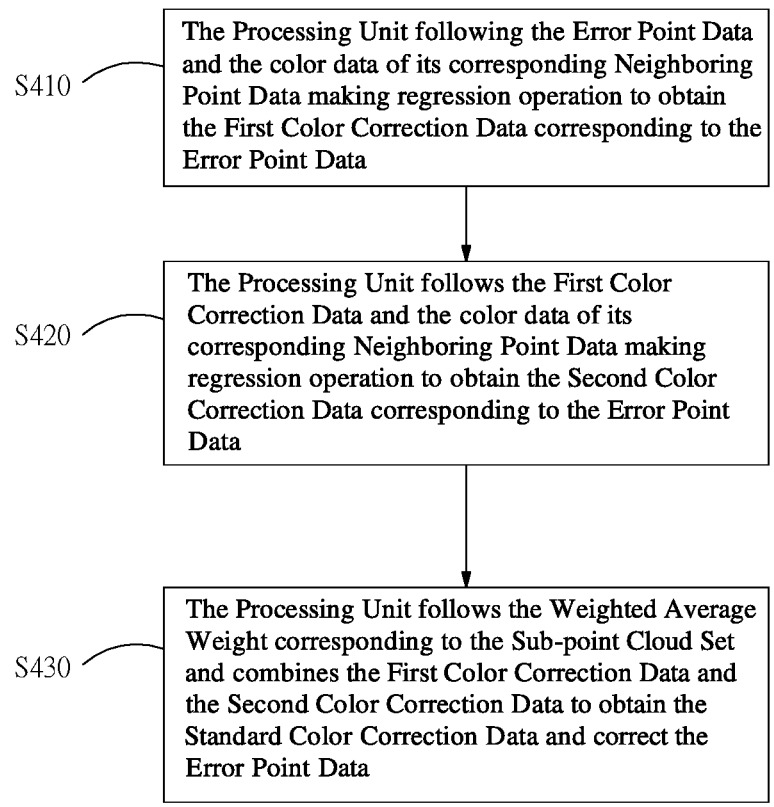
Figure 6B:
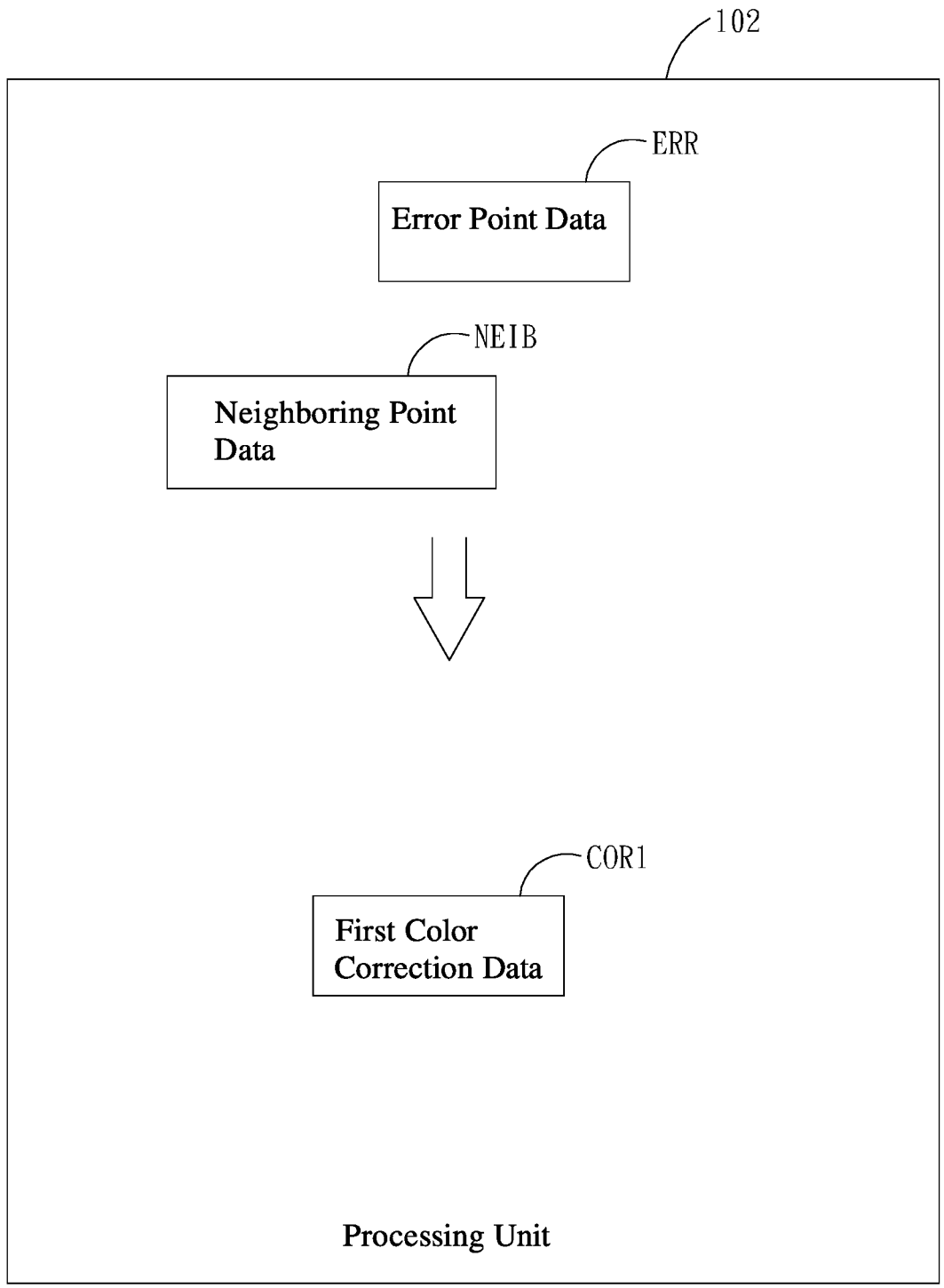
Figure 6C:
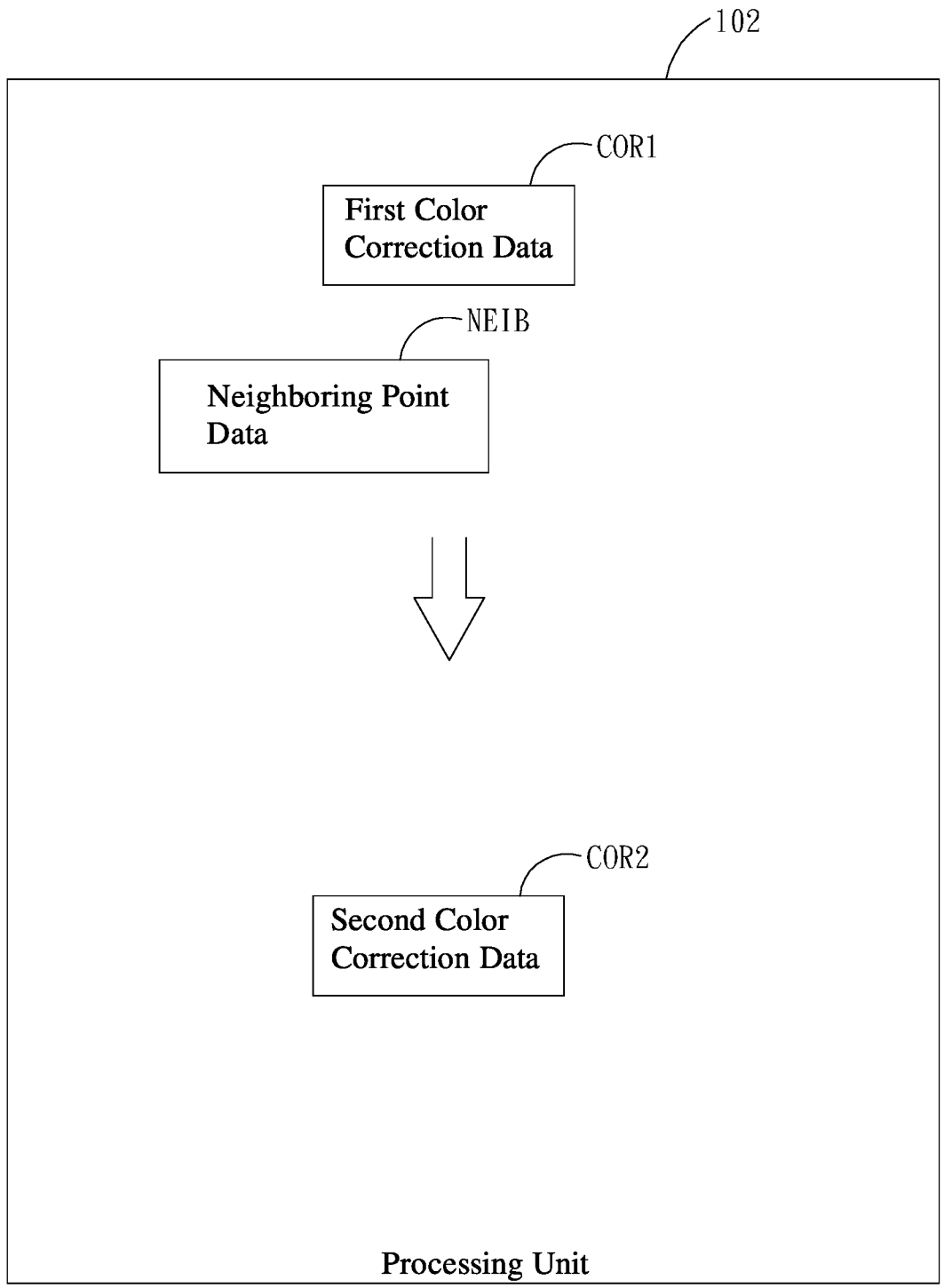
Figure 6D:
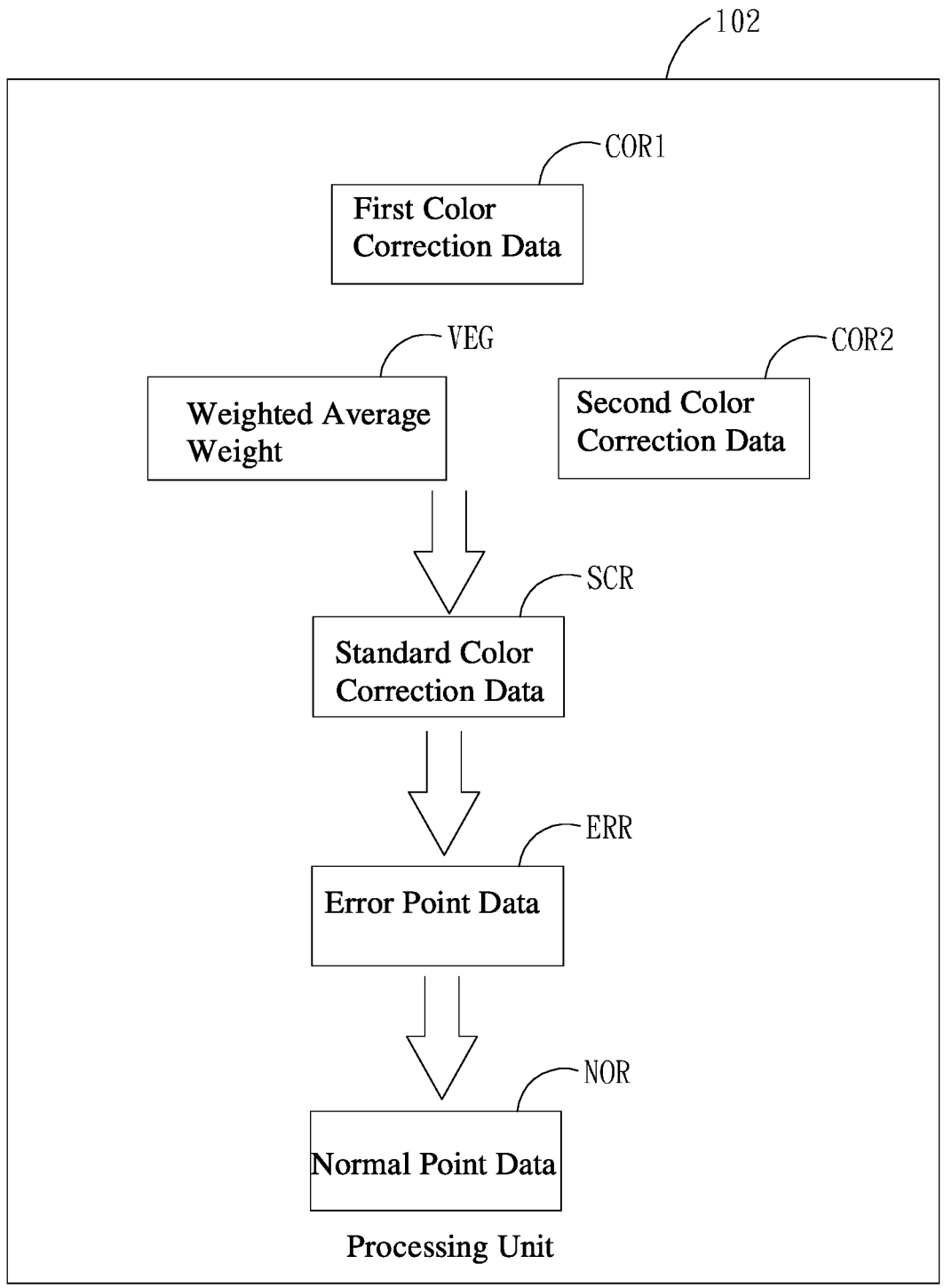
Figure 7A:
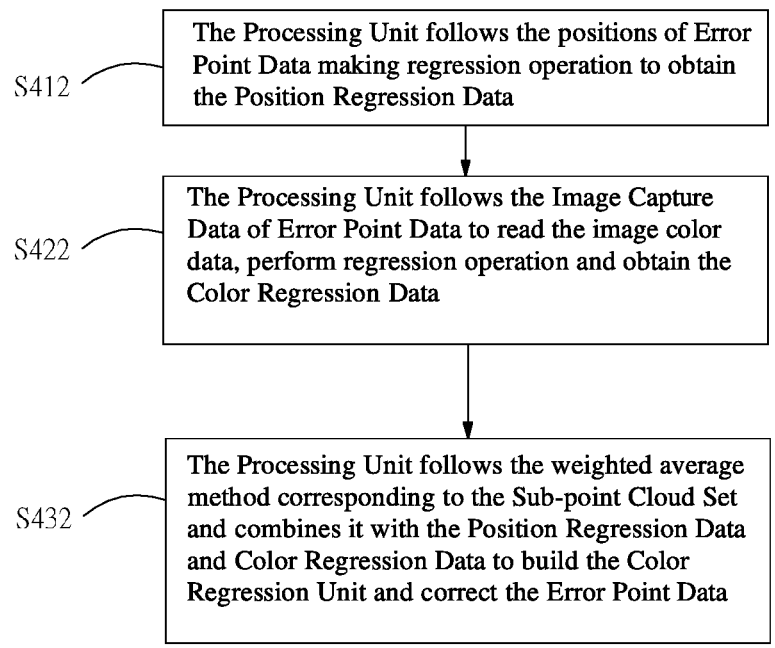
Figure 7B:
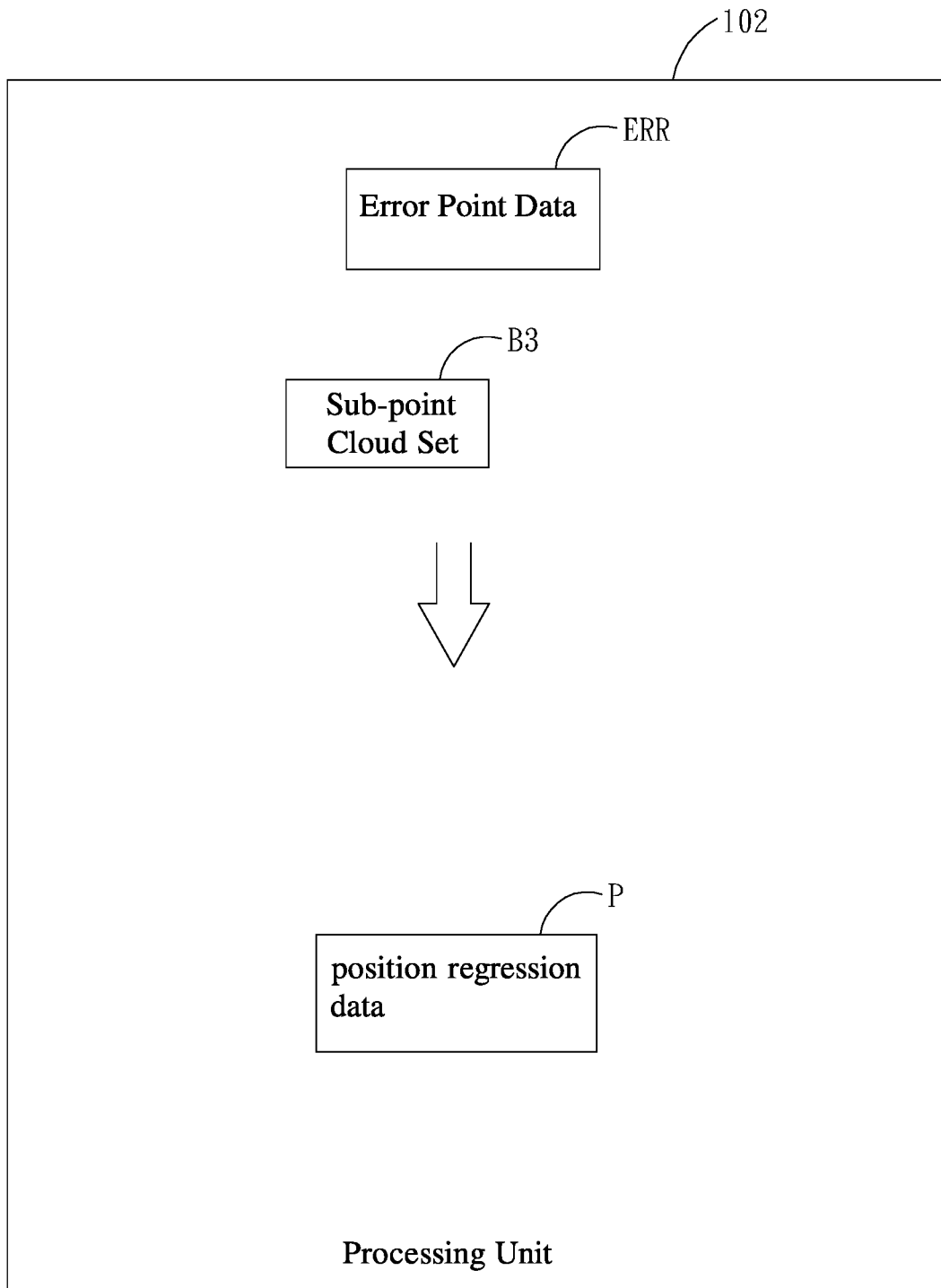
Figure 7C:
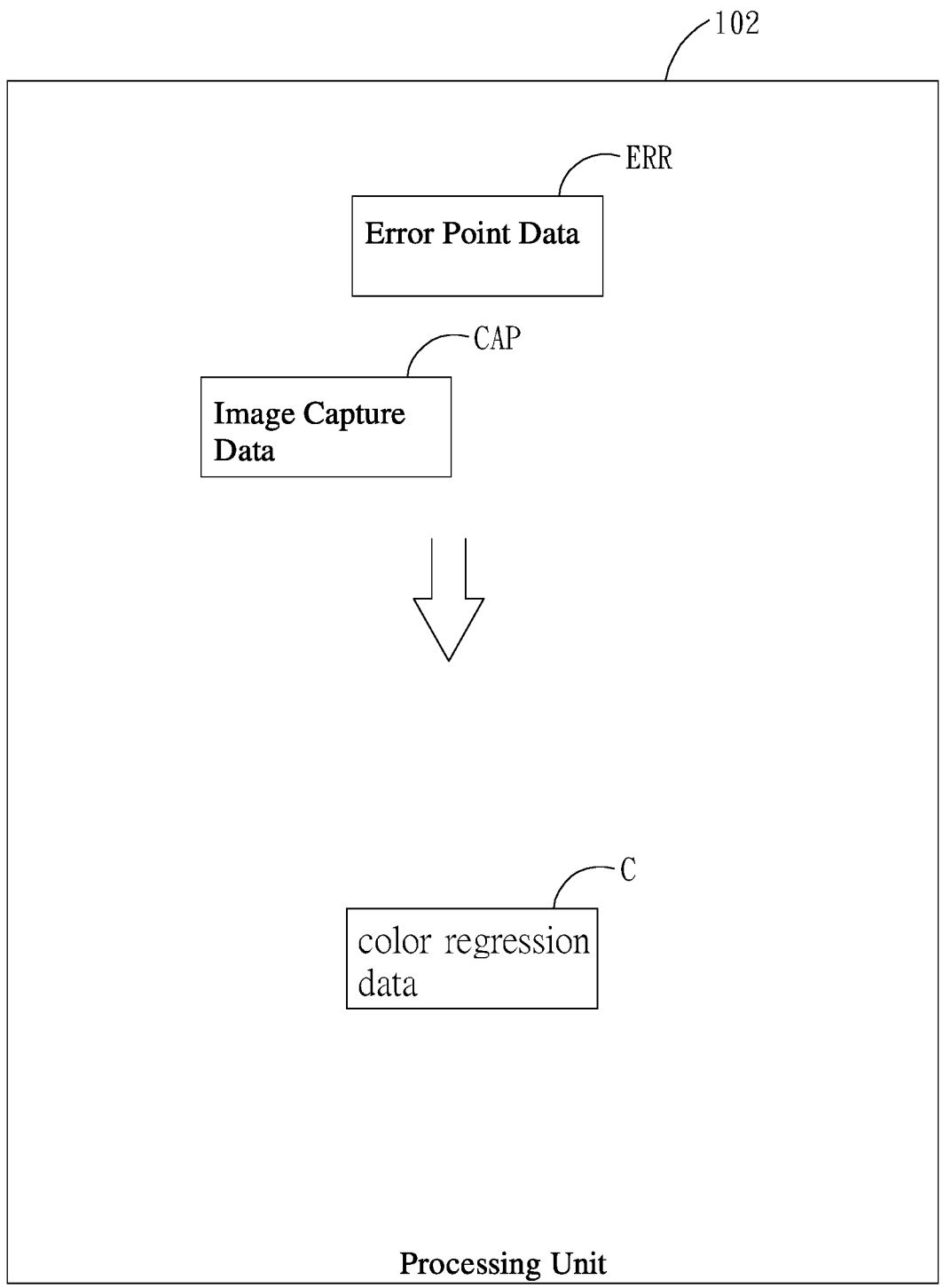
Figure 7D:
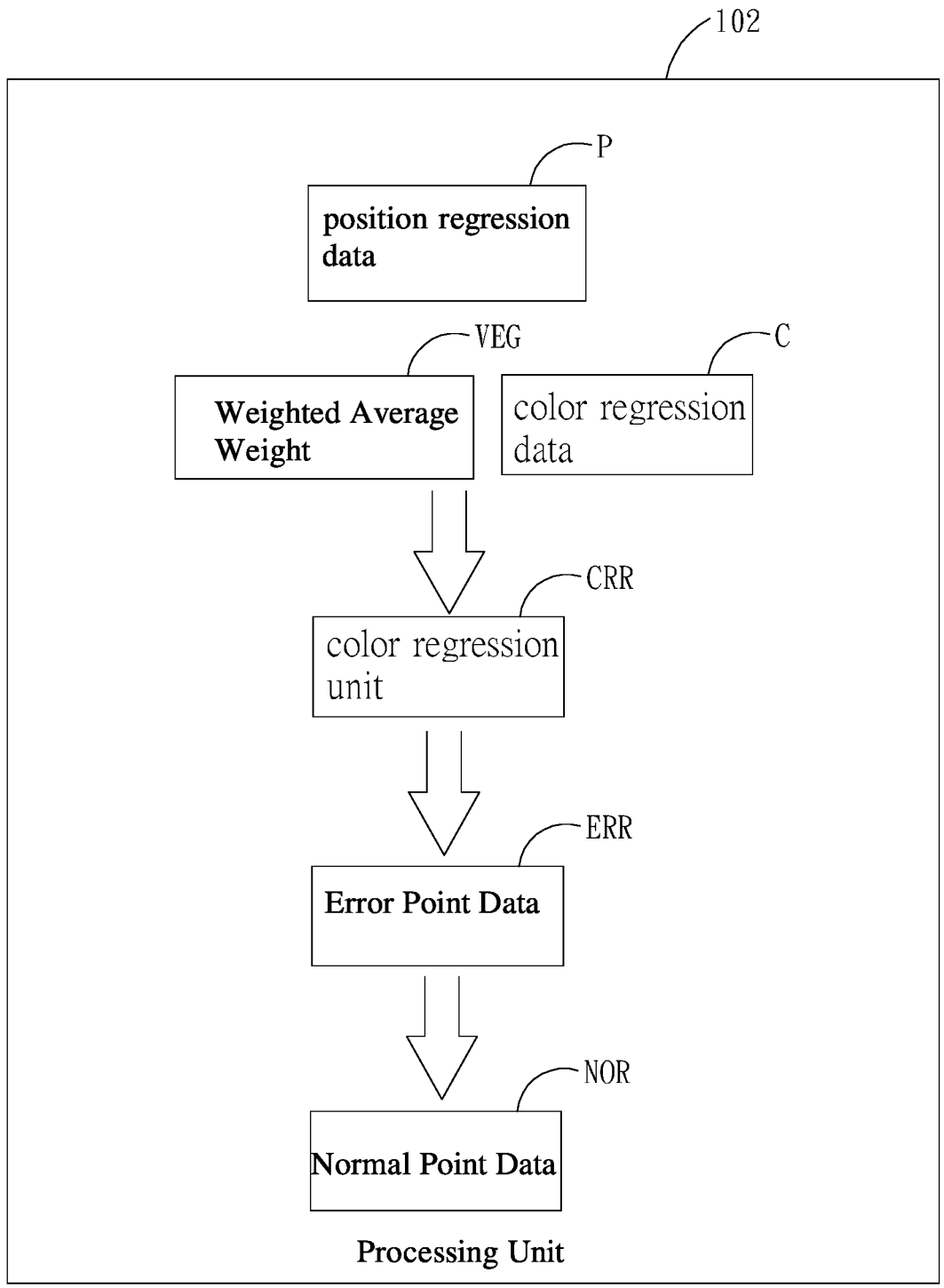

FIG. 2A: The schematic diagram of inputting Point Cloud Data in an embodiment of this application;

FIG. 2B: The schematic diagram of Point Cloud Data format in an embodiment of this application;

FIG. 2C: The schematic diagram of Dividing Point Cloud Data in an embodiment of this application;

FIG. 2D: The schematic diagram of recognizing Error Point Data in an embodiment of this application;

FIG. 2E: The schematic diagram of correcting Error Point Data in an embodiment of this application;

FIG. 3A: The schematic diagram of dividing Point Cloud Data in an embodiment of this application;

FIG. 3B: The schematic diagram of Voxel Space and Voxel Grid in an embodiment of this application;

FIG. 3C: The schematic diagram of categorizing Sub-point Cloud Set in an embodiment of this application;

FIG. 4A: The schematic diagram of recognizing Error Point Data in an embodiment of this application;

FIG. 4B: The schematic diagram of recognizing Error Point Data in an embodiment of this application;

FIG. 5A: The other flowchart of recognizing Error Point Data in an embodiment of this application;

FIG. 5B: The schematic diagram of recognizing Error Point Data in an embodiment of this application;

FIG. 6A: The flowchart of correcting Error Point Data in an embodiment of this application;

FIG. 6B: The schematic diagram of generating First Color Correction Data in an embodiment of this application;

FIG. 6C: The schematic diagram of generating Second Color Correction Data in an embodiment of this application;

FIG. 6D: The schematic diagram of correcting Error Point Data in an embodiment of this application;

FIG. 7A: The other flowchart of correcting Error Point Data in an embodiment of this application;

FIG. 7B: The schematic diagram of generating Position Regression Data in an embodiment of this application;

FIG. 7C: The schematic diagram of generating Color Regression Data in an embodiment of this application; and FIG. 7D: The schematic diagram of correcting Error Point Data in an embodiment of this application.

DETAILED DESCRIPTION

To enable the Review Committee members having deeper realization and understanding on the features and functions of this application, we hereby put the embodiment and detailed explanation in below:

The conventional method for correcting point cloud images causes the problem of reduced efficiency in manual correction. This application improves the shortcomings of the conventional method for correcting point cloud images, as well as to reduce the single calculation amount of the computer, which improves the computer's calculation efficiency of the correction in point cloud images.

Hereinafter, various embodiments of this application are described in detail through the use of figures. However, the concept of this application may be embodied in many different forms, and should not be construed as being limited to the exemplary embodiments described herein.

FIG. 1 shows the method and flow of correcting abnormal Point Cloud Data in this application, which is the flowchart in an embodiment of this application. As shown in the figure the steps are as follows:

Step S05: Using the optical scanning unit to form image by points and generate the point cloud data;

Step S10: Using the processing unit to read the primitive point cloud data;

Step S20: The processing unit following the primitive vector data to divide the point cloud array and obtain a plurality of sub-point cloud set and the corresponded plural distribution feature data;

Step S30: The processing unit following the distribution feature data to identify the corresponded sub-point cloud set and obtain the sub-point cloud set which contains the error point data; and Step S40: The processing unit following the corresponded Distribution Feature Data to correct the error point data.

The steps of correcting the abnormal point cloud data in this application are S10 to S40; in order to interpret the method and flow of correcting the abnormal point cloud data in this application in a more specific matter, we hereby make an embodiment; refer to FIG. 2A to 2E, which is the schematic diagram of inputting Point Cloud Data, the schematic diagram of Point Cloud Data format, the schematic diagram of Dividing Point Cloud Data and the schematic diagram of recognizing Error Point Data in an embodiment of this application; whereas the correction of Error Point Data is shown in FIG. 6A to FIG. 6D. as shown in FIG. 2A to 2E, the Correction System 10 of this application includes a Processing Unit 102 and an Optical Scanning Unit 104; in this embodiment, the Optical Scanning Unit 104 scans the outer structure and creates a respective Primitive Point Cloud Data PC1, which is transmitted to the Data Base DB, for the Processing Unit 102 reading the corresponded Primitive Point Cloud Data PC1 from the Data Base DB. Yet, this application isn't restricted to this; the Processing Unit 102 can read the corresponded Primitive Point Cloud Data PC1 from the Data Base DB through wireless transmission; the Optical Scanning Unit 104 in this embodiment can be a Lidar, a 3-D laser scanner or a light-beam scanner.

In Step S05, as shown in FIG. 2A, after the Optical Scanning Unit 104 has scanned the structure, it creates the corresponded Primitive Point Cloud Data PC1 and is sent to the Data Base DB; the Primitive Point Cloud Data PC1 contains a plurality of Normal Point Data (such as Point 1 Data D1 and Point 2 Data D2), at least an Error Point Data (such as Point 3 Data D3) and a Primitive Voxel Space Data V (such as the one shown in FIG. 2C).

In Step S10, as shown in FIG. 2A, the Processing Unit 102 reads data stored in Data Base DB; as shown in FIG. 2B, Point Cloud Data PC contains the Header Zone H and Data Zone D, wherein Header Zone H contains the data with data type H1 and category label H2; besides, the Header Zone H can add the settings according to using requirements, such as: the parcel column and etc. The Data Zone D contains the data of points, such as: a $1^{st}$ Point Data D1, a $2^{nd}$ Point Data D2 and a $3^{rd}$ Point Data D3, etc. Since to be a fundamental image model, the point data amounts in the ordinary Point Cloud Data are over 100 thousand, therefore, in this embodiment, the data of three points are taken for example. The $1^{st}$ Point Data D1, the $2^{nd}$ Point Data D2 and the $3^{rd}$ Point Data D3 have a plurality of First Attribute Data DD1, a plurality of $2^{nd}$ Attribute Data DD2 and a plurality of Third Attribute Data DD3 each, that is, they are corresponded to position data, color data, intensity data and scanning data; among them the position data is the coordinate corresponded to the Primitive Voxel Space Data V, the color data is the color value obtained while being scanned by the Optical Scanning Unit 104, the intensity data is the light reflection intensity provided during the scanning of Optical Scanning Unit 104, and the scanning data is the label value created during the scanning of Optical Scanning Unit 104. For example, the Point Cloud Data created by the Optical Scanning Unit 104 is a point-type recording, each point includes the position data (3-D coordinate or geometric location), color data and intensity data, wherein the intensity data indicates the echo intensity received by Optical Scanning Unit 104; therefore, the intensity data corresponding to the scanning data includes the surface material, roughness and incident angle direction of the scanned object and the light-emitting energy and light wavelength of Optical Scanning Unit 104.

In Step S20, as shown in FIG. 2C, system analyzes the distribution status of point data at Primitive Voxel Space Data V via the Processing Unit 102, dividing the Primitive Point Cloud Data PC1 to obtain a plurality of Sub-point Cloud Sets B1-Bn; meanwhile, it obtains a plurality of corresponded Distribution Feature Data F1-Fn, further refer to FIG. 3A; step S20 includes:

Step S210: Processing Unit following the Voxel Grid of Primitive Voxel Space Data to divide the Primitive Point Cloud Data to the Sub-point Cloud Set;

Step S220: Regarding the Sub-point Cloud Set, the Processing Unit performing the nearest neighbor index operation, principal component analysis operation and de-constraint conversion operation to obtain the Distribution Feature Data;

Step S230: The Processing Unit categorizing the Sub-point Cloud Set according to the Distribution Feature Data and obtains the category labels; and Step S240: The Processing Unit following the category labels to label the Sub-point Cloud Set.

In Step S210, as shown in FIG. 3B, the Primitive Voxel Space Data V, as read by the Processing Unit 102, has a plurality of Voxel Grid VGs, and these Voxel Grid VGs can have different scale; yet, basing on the uniform distribution of point cloud, the scales can be identical; this embodiment applies the identical scale, i.e., Voxel Grid VGs use the same scale. In Step S220, while the Processing Unit 102 is performing the nearest neighbor index operation, it is performing a K-Nearest Neighbor (KNN) searching algorithm on the Primitive Point Cloud Data PC1 and obtains the nearest neighbor points of the Normal Point Data and the Error Point Data; for example, assume the position data of a point cloud is p, a position data set of it is P; the way the position data p makes KNN searching operation in the position regression data P is through sorting the distance from each other position data in the position regression data P to the position data p $\|p-P\|$, finding the subset S of the position regression data P with k data, and subtracts from the subset S and the position regression data P. The difference set P\S of the sub-set S satisfies $\max(\|p-S\|) \leq \min(\|p-PS\|)$, and obtains the nearest neighbor data.

Continue to above, the method for the Processing Unit 102 performing the principal component analysis operation follows three-axis variances to perform conversion operation of Primitive Point Cloud Data PC1; the method for the Processing Unit 102 performing the de-constraint conversion operation follows three-axis variances to perform logarithm operation to remove the boundaries of the variances. Among them, the principal component analysis operation of this embodiment is to take the 3 variances of the three main axes and name them from large to small as $\lambda_2$ and $\lambda_3$, $\lambda_1 \geq \lambda_2 \geq \lambda_3 \geq 0$; the de-constraint conversion operation of this embodiment is the conversion from $\lambda_1 \lambda_2$ and $\lambda_3$ to $f_1$, $f_2$ and $f_3$, the equation is as follows:

$$\begin{cases} f_1 = \log(\lambda_1 - \lambda_2) \\ f_2 = \log(\lambda_2 - \lambda_3) \\ f_3 = \log(\lambda_3) \end{cases} \quad \text{Eq. (1)}$$

In Step S230, as shown in FIG. 3C, after has obtained the Sub-point Cloud Set B1-Bn and the Distribution Feature Data F1-Fn, the Processing Unit 102 categorizes the Sub-point Cloud Set B1-Bn and write in the category labels to the corresponded Distribution Feature Data. For example, Sub-point Cloud Set B1, B2 and B4-Bn are categorized in a $1^{st}$ Category Point Cloud C1, Sub-point Cloud Set B3 is categorized in $2^{nd}$ Category Point Cloud C2; continue to Step S240, system labels Sub-point Cloud Set B1-Bn according to the categorization.

In Step S30, as shown in FIG. 2D, the Processing Unit 102 identifies the divided Sub-point Cloud Set B1-Bn to obtain at least an Error Point Data ERR; this embodiment applies single Error Point Data ERR for example, yet, this application is not restricted to this, it follows the actual distribution status of Error Point Data ERR in the Sub-point Cloud Set B1-Bn to identify the corresponded Error Point Data ERR. Among them, refer to FIG. 4A, Step S30 includes following steps:

Step S310: The Processing Unit following the categorization of Sub-point Cloud Set and the corresponded point cloud marking numbers to identify the Normal Point Data and the Error Point Data.

In Step S310, as shown in FIG. 4B, since the categorization of Sub-point Cloud Set B1-Bn doesn't further clarify if there is the abnormal point cloud or not, the Processing Unit 102 follows $1^{st}$ Category Point Cloud C1 and $2^{nd}$ Category Point Cloud C2 and the corresponded point cloud labeling numbers (for example, B1-Bn), furthermore, the Processing Unit 102 identifies the Normal Point Data NOR and Error Point Data ERR in the Sub-point Cloud Set B1-Bn. If the Sub-point Cloud Set B1-Bn is categorized against $1^{st}$ Category Point Cloud C1 and $2^{nd}$ Category Point Cloud C2, then, the $2^{nd}$ Category Point Cloud C2 is the point cloud category that contains the Error Point Data ERR; therefore, in Step S30, except the one shown in FIG. 4A, it further includes the identifying method stated in Step S310-330 above; as shown in FIG. 5A, Step S30 can further include the following steps:

Step S312: The Processing Unit following the second category point cloud and the corresponded labeling numbers to identify and obtain the Error Point Data.

As shown in FIG. 5B, in Step S312, since the categorizing step has categorized the Sub-point Cloud Set that contains the Normal Point Data and the Sub-point Cloud Set that contains the Error Point Data, therefore, the Processing Unit 102 only needs to identify the $2^{nd}$ category point cloud C2 and needs not to identify the other categories; meanwhile, in this embodiment, Processing Unit 102 only takes out the Error Point Data ERR and doesn't change the Normal Point Data NOR.

In Step S40, as shown in FIG. 2E, the Processing Unit 102 performs correction on the Error Point Data ERR according to the Distribution Feature Data it obtained earlier; this embodiment uses the Sub-point Cloud Set B3 to include the Error Point Data ERR, therefore, the Processing Unit 102 reads the color data of nearest neighboring points from the corresponding Distribution Feature Data F3 and uses them to correct the Error Point Data ERR into the Normal Point Data NOR. Refer to FIG. 6A, Step S40 includes following steps:

Step S410: The Processing Unit following the Error Point Data and the color data of its corresponding Neighboring Point Data making regression operation to obtain the First Color Correction Data corresponding to the Error Point Data;

Step S420: The Processing Unit follows the First Color Correction Data and the color data of its corresponding Neighboring Point Data making regression operation to obtain the Second Color Correction Data corresponding to the Error Point Data; and Step S430: The Processing Unit follows the Weighted Average Weight corresponding to the Sub-point Cloud Set and combines the First Color Correction Data and the Second Color Correction Data to obtain the Standard Color Correction Data and correct the Error Point Data.

As shown in FIG. 6B, in Step S410, the Processing Unit 102 performs regression operation according to the identified Error Point Data ERR and the color data (equivalent to the color data of the attributive data DD1, DD2 and DD3 shown in FIG. 2B) of its corresponding Neighboring Point Data NEIB, obtained a First Color Correction Data COR1 corresponding to the Error Point Data ERR. Continue to Step S420, as shown in FIG. 6C, perform the second regression operation of the color data in the First Color Correction Data COR1 and the Neighboring Point Data NEIB to obtain a Second Color Correction Data COR2 corresponding to Error Point Data ERR; continue to Step S430, as shown in FIG. 6D, the Processing Unit 120 follows the First Color Correction Data COR1 and the Second Color Correction Data COR2 obtained from Step S410 and Step S420 and the Weighted Average Weight VEG corresponding to the Sub-point Cloud Set (in this embodiment, take the Sub-point Cloud Set B3 for example) where the Error Point Data ERR locates making regression operation to obtain the Standard Color Correction Data SCR and correct the Error Point Data ERR, and further obtaining the corresponded Normal Point Data NOR in the prospective of correcting the abnormal Point Cloud Data.

Continue to above, in the correction method for this application, except making regression operation on the neighboring color data, Step S40 not only further includes Step S410-430 shown in FIG. 6A in point cloud correction, Step S40 also includes the following steps as shown in FIG. 7A:

Step S412: The Processing Unit follows the positions of Error Point Data making regression operation to obtain the Position Regression Data;

Step S422: The Processing Unit follows the Image Capture Data of Error Point Data to read the image color data, perform regression operation and obtain the Color Regression Data; and Step S432: The Processing Unit follows the weighted average method corresponding to the Sub-point Cloud Set and combines it with the Position Regression Data and Color Regression Data to build the Color Regression Unit and correct the Error Point Data.

As shown in FIG. 7B, in Step S412, the Processing Unit 102 follows all position data of the Sub-point Cloud Set B3 where the Error Point Data ERR locates at performing regression operation to obtain the corresponded Position Regression Data; this process is in the goal of re-obtaining more accurate Position Regression Data P. Continue to Step S422, as shown in FIG. 7C, the Processing Unit 102 follows the Error Point Data ERR to read the corresponded Image Capture Data CAP; the Processing Unit 102 reads the corresponded color data CR from the Image Capture Data CAP and makes regression operation to obtain the corresponded Color Regression Data C, wherein the Image Capture Data CAP is the digital image data is directly captured by the image capture unit from the aerial images and other digital images, such as the digital camera images, aerial and camera images and satellite images, etc. Continue to Step S432, the Processing Unit 102 follows the Position Regression Data P and Color Regression Data C generated in Step S412 and Step S422 and the Weighted Average Weight VEG of Sub-point Cloud Set B3 corresponding to the Error Point Data ERR making regression operation, and thus builds the corresponded Color Regression Unit CRR and use it to correct the Error Point Data ERR, obtaining the corresponded Normal Point Data NOR.

For example, the aforesaid Position Regression Data P applies the KNN algorithm to calculate the nearest neighbor of Error Point Data ERR in the Point Cloud Data PC, which is to obtain the nearest neighbor S of the Position Regression Data in the Normal Point Data NOR, and thus makes regression calculation on the average color value of all points at the nearest neighbor S, and obtains the correcting result corresponding to the Color Regression Data C and use it to correct the Error Point Data ERR into the Normal Point Data NOR.

Sum up, in this application, the Sub-point Cloud Set B1-Bn are divided from the Primitive Point Cloud Data PC1 for making categorization and labeling numbers on them, which enables the Processing Unit 102 having better efficiency in processing the Sub-point Cloud Set B1-Bn than directly processing the Primitive Point Cloud Data PC1; through the aforesaid various dividing operation, identifying and even correcting methods, it can further reduce the operating loading of the Processing Unit 102, and thus promotes the operating efficiency of the Point Cloud Data in correcting the Error Point Data.

What is claimed is:

1. A method for correcting abnormal Point Cloud Data, applied for a Correction System including an Image Processing Unit and an Optical Scanning Unit, the Optical Scanning Unit scanning an outer structure to create a Primitive Point Cloud Data and transmit the Primitive Point Cloud Data to a Data Base, the method for correcting the abnormal Point Cloud Data comprising the steps of:

the Image Processing Unit reading the Primitive Point Cloud Data from the Data Base; the Primitive Point Cloud Data includes a plurality of Normal Point Data and at least an Error Point Data and a Primitive Voxel Space Data;

the Image Processing Unit following the Primitive Voxel Space Data to divide the Primitive Point Cloud Data and obtain a plurality of Sub-Point Cloud Sets and the corresponded plural Distribution Feature Data; these Sub-Point Cloud Sets have the Normal Point Data and the Error Point Data;

the Image Processing Unit following the Distribution Feature Data to identify the Sub-point Cloud Sets and obtain the Error Point Data; and the Image Processing Unit following a Distribution Feature Data corresponding to the Error Point Data to make regression operation and correct the Error Point Data into a Normal Point Data.

2. The method for correcting the abnormal Point Cloud Data of claim 1, wherein the Normal Point Data and the Error Point Data include a coordinate data, a color data and an intensity data; the coordinate data corresponds to the Primitive Voxel Space Data.

3. The method for correcting the abnormal Point Cloud Data of claim 2, wherein the Distribution Feature Data include a plurality of position eigenvalues, color eigenvalues and intensity eigenvalues corresponding to the Normal Point Data and the Error Point Data.

4. The method for correcting the abnormal Point Cloud Data of claim 1, further comprising the steps of:

using the Optical Scanning Unit to point-by-point form image and create the Point Cloud Data.

5. The method for correcting the abnormal Point Cloud Data of claim 4, wherein the Optical Scanning Unit is a Lidar, a 3-D laser scanner or a light-beam scanner.

6. The method for correcting the abnormal Point Cloud Data of claim 1, wherein in the steps that the Image Processing Unit follows the Primitive Voxel Space Data to divide the Primitive Point Cloud Data and obtain a plurality of Sub-Point Cloud Set and the corresponded plural Distribution Feature Data, the steps include:

the Image Processing Unit following the plural Voxel Grids of the Primitive Voxel Space Data to divide the Primitive Point Cloud Data into the Sub-Point Cloud Sets;

the Image Processing Unit performing a nearest neighbor index operation, a principal component analysis operation and a de-constraint conversion operation according to the Primitive Point Cloud Setting and obtaining the Distribution Feature Data, which respectively correspond to all neighboring points of each image point in the Sub-Point Cloud Sets;

the Image Processing Unit categorizing the Sub-Point Cloud Sets according to the Distribution Feature Data to obtain a plurality of category labels; and the Image Processing Unit labels the Sub-Point Cloud Sets according to the category labels.

7. The method for correcting the abnormal Point Cloud Data of claim 6, wherein the Image Processing Unit performs the nearest neighbor index operation by running a K-Nearest Neighbor (KNN) search algorithm to run the Primitive Point Cloud Data; the Image Processing Unit performs the principal component analysis operation and the conversion operation according to the three-axis variances and the Primitive Point Cloud Data; the Image Processing Unit performs the de-constraint conversion operation by means of logarithmic operation according to the three-axis variances, in the prospective of removing the boundaries corresponding to these variances.

8. The method for correcting the abnormal Point Cloud Data of claim 1, wherein in the step that the Image Processing Unit follows the Distribution Feature Data to identify the Sub-point Cloud Sets, the Image Processing Unit follows the categories of the Sub-point Cloud Sets and the corresponded plural label numbers to identify the Normal Point Data and the Error Point Data.

9. The method for correcting the abnormal Point Cloud Data of claim 1, wherein in the steps that the Image Processing Unit follows the Distribution Feature Data to identify the Sub-point Cloud Sets, the Image Processing Unit follows at least a second category cloud of the Sub-point Cloud Set and at least a corresponded label number to identify and obtain the Error Point Data.

10. The method for correcting the abnormal Point Cloud Data of claim 1, wherein in the steps that the Image Processing Unit follows the corresponded Distribution Feature Data to correct the Error Point Data, the steps include:

the Image Processing Unit following the Error Point Data and the color data of at least a Neighboring Point Data to perform regression operation and obtain a First Color Correction Data corresponding to the Error Point Data;

the Image Processing Unit following the color data of the Neighboring Point Data of the First Color Correction Data and the Error Point Data to perform regression operation and obtain a Second Color Correction Data corresponding to the Error Point Data; and the Image Processing Unit following a weighted average method for the Sub-Point Cloud Set and combines it with the First Color Correction Data and the Second Color Correction Data to obtain a Standard Color Correction Data, used to correct the Error Point Data.

11. The method for correcting the abnormal Point Cloud Data of claim 1, wherein in the steps that the Image Processing Unit follows the corresponded Distribution Feature Data to correct the Error Point Data, the steps include:

the Image Processing Unit following a position data corresponding to the Error Point Data to perform regression operation and obtain a Position Regression Data;

the Image Processing Unit following an Image Capture Data corresponding to the Error Point Data to read an image color data and perform regression operation to obtain a Color Regression Data; and the Image Processing Unit following a weighted average method corresponding to the Sub-Point Cloud Sets and combining it with the Position Regression Data and the Color Regression Data to build a Color Regression Unit and correct the Error Point Data.

\* \* \* \* \*